United States Patent [19]

Weinhold

[11] 4,152,016

[45] May 1, 1979

[54] HOSE FIXING DEVICE

[76] Inventor: Karl Weinhold, Im Jagdfeld 43, D-4040 Neuss, Fed. Rep. of Germany

[21] Appl. No.: 778,334

[22] Filed: Mar. 16, 1977

[30] Foreign Application Priority Data

Mar. 17, 1976 [DE] Fed. Rep. of Germany ....... 2611174

[51] Int. Cl.$^2$ .............................................. F16L 55/00
[52] U.S. Cl. ..................................... 285/174; 285/243
[58] Field of Search ............... 285/243, 252, 253, 420, 285/242, 245-249, 250, 255, 256, 373, 174, 419

[56] References Cited

U.S. PATENT DOCUMENTS

| 806,135 | 12/1905 | Greenfield | 285/174 X |
|---|---|---|---|
| 1,733,072 | 10/1929 | Pierce | 285/419 X |
| 2,725,246 | 11/1955 | Weinhold | 285/252 |
| 3,396,993 | 8/1968 | Weinhold | 285/243 X |

FOREIGN PATENT DOCUMENTS

1911969 10/1970 Fed. Rep. of Germany .......... 285/174

Primary Examiner—Dave W. Arola
Attorney, Agent, or Firm—Spencer & Kaye

[57] ABSTRACT

A hose fixing device comprises a nozzle member for receiving a hose end pushed thereon and provided with an annular projection engaging the hose, a connecting member for connection to a pipe or other line, and provided with a collar, the two members being connected by a plug and socket connection with an intervening seal, a plurality of shell parts jointed together and extending around the members, the shell parts being provided with clamping flanges for pressing the hose against the nozzle member behind the annular projection and for engaging behind the collar of the connecting member and a toggle actuated lock for opening and closing the shell parts.

12 Claims, 6 Drawing Figures

HOSE FIXING DEVICE

BACKGROUND OF THE INVENTION

The invention relates to a hose fixing device for connecting a hose-shaped connecting piece to a hose end which is pushed on to a nozzle and is held thereon by clamping flanges of a clamping device surrounding the nozzle, wherein the clamping device has shell parts connected together by a joint and a toggle actuated lock, and the shell parts are provided with radially inwardly extending clamping flanges which, on one side, press the hose end directly behind an external annular projection located on the nozzle, against the nozzle, and, on the other side, engage behind an external collar located on the connecting piece.

In a known hose fixing device of this type, the connecting piece and the nozzle merge into each other as one piece. In order to detach the connection, after opening the toggle actuated lock, either the end must be completely removed from the nozzle, or the connecting piece itself must be detached from a piece of hoseline. Both possibilities are disadvantageous because of the technical effort required or because of the more difficult handling.

Furthermore it is known to construct the ends of two hoselines to be connected as a connecting device, one of which is constructed as a plug part and the other as a socket part and both have an external collar respectively behind which is engaged the clamping flanges of the clamping device. However, this type of hose connection is not suitable for connecting hoses.

In fact it is known to connect a hose end to a connecting piece either in fixed manner or so as to be detached with difficulty and also to connect the connecting piece to another connecting piece again by means of a plug connection comprising a plug part and a socket part. However, if the hose should be replaced for example because of damage, then it is only possible to separate the connecting piece from the hose in a relatively complicated manner and by using tools. Apart from the fact that this effort is disadvantageous in practice the connecting piece is often thrown away together with the hose.

The last-mentioned form of a hose fastening is also disadvantageous because it requires a relatively large amount of space in a longitudinal direction.

SUMMARY OF THE INVENTION

It is an object of the invention to provide an improved hose fixing device, for example, of the type stated at the outset, to the effect that a hose end pushed on to a nozzle may be connected to one end of a hoseline in a very simple manner.

According to the invention, there is provided a hose fixing device comprising a nozzle member for receiving a hose end pushed thereon, a connecting member for attachment to a hose or other line, a plug portion on one said member, a socket portion on the other said member to receive said plug portion, an annular seal between said plug portion and said socket portion, an annular projection on said nozzle member for engaging the hose end, a collar on said connecting member, a plurality of shell parts jointed together and extending around said nozzle member and said connecting member, first clamping flanges on said shell parts for engagement with the hose behind said annular projection to press the hose onto said nozzle member, second clamping flanges on said shell parts for engagement behind said collar on said connecting member and a toggle actuated lock for opening and closing said shell parts.

BRIEF DESCRIPTION OF THE DRAWINGS

The invention will now be described in greater detail, by way of example, with reference to the drawings, in which.

DESCRIPTION OF THE PREFERRED EMBODIMENTS

Figure 1:
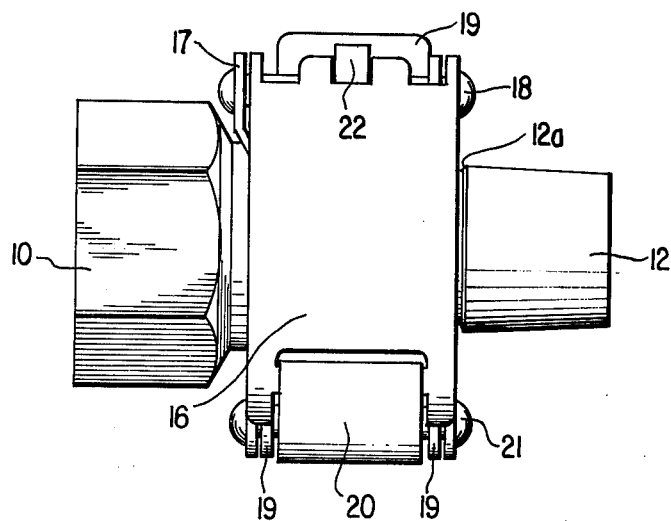
FIG. 1 shows a side view of a hose fixing device in accordance with the invention.

In a preferred embodiment of the invention it is proposed that the connecting piece and the nozzle should be designed to be separated from each other and should be constructed at their ends as parts of a detachable plug connection having a socket part, a plug part and an annular seal.

This hose fixing device has the advantage that the clamping device with its shell parts may serve simultaneously to press the hose end on to the nozzle and to hold the plug connection together. These functions may be coupled with a very short constructional length. If the connection is released by means of opening of a toggle actuated lock, the hose end remains pushed on to the nozzle; only the radial pressure required for sealing between hose and nozzle is missing and this is not required when the connection is open. If it is necessary to replace the hose, then the hose end may be removed relatively simply when the clamping device is open and in fact without detaching a further connection with the aid of tools. Thus it is ensured that, in practice, none of the parts of the device are thrown away under any circumstances.

By pressing the hose end directly behind the annular projection on the nozzle, the latter is however held in an axial direction and is secured against release from the other part of the plug connection. This safety device may be improved moreover, in accordance with a further proposal, in that the part of the nozzle situated behind the annular projection in the direction of thrust of the hose end has an increasing outer diameter towards the nozzle end. The increase in the outer diameter may take place relatively slowly and continuously; however, a stopped increase, for example in the form of a further annular projection is also conceivable.

Furthermore, it is proposed that the connecting piece should have a radially outwardly extending mounting which is penetrated by a jointed pin connecting the shell parts.

As a result, the connecting piece is non detachably connected to the shell parts and the toggle actuated lock. The nozzle is completely free however at its outer periphery, after separation from the connecting piece, so that the hose may be pushed on or removed simply. If the hose should be seated too firmly on the nozzle, then the latter may be clamped without difficulty; the use of other tools is also possible without restriction by the shell parts.

The mounting may be constructed as a washer-shaped construction part which is fixed on the outer wall of the connecting piece between its collar and a retaining ring.

In a further refinement of the invention, it is proposed that at least one additional flange should extend radially inwards between the clamping flanges of the shell parts and that the additional flange should be so arranged that, at the same time as a clamping flange, it presses the hose on to the nozzle.

As a result it is possible to press the hose on to the nozzle doubly and thus to increase the sealing effect which may be achieved and to increase the retaining action in an axial direction. The additional flange may thus be arranged in the central region between the clamping flanges. The danger with only two clamping flanges of irregular spring loading is overcome by using this type of additional flange.

In this connection moreover it is proposed that the spring and/or the toggle lever of the toggle actuated lock should be offset with respect to the centre, given by half of the axial spacing between the clamping flanges in the direction of the clamping flanges gripping the pipe.

As a result, the tensioning force applied by the toggle actuated lock is centred around that region in which radial pressing force is necessary in order to achieve an optimum sealing action. In contrast, this type of radial force is not necessary on those clamping flanges which engage behind the collar on the connecting piece. Thus buckling or warping of the shell parts because of the irregular radial loading of the same across their axial length, is prevented.

In a further refinement of the invention, it is proposed that two additional flanges should extend radially inwards between the clamping flanges of the shell parts, at least one of which being so arranged that it presses the pipe on to the nozzle at the same time as a clamping flange. The two additional flanges may be constructed as a component part of an additional shell part and attached to the inside of a shell part. Among other things, simplification in manufacture is the result of the symmetrical cross-sectional shape of the additional shell part now possible. If necessary the pipe may be pressed against the nozzle with two additional flanges in addition to the clamping flange. The use of two additional flanges is still advantageous in the following connection:

If the connection of connecting piece and nozzle is put under load in an axial direction in the sense of their separation, then the forces resulting from this load may only be transmitted to the connecting piece via those clamping flanges of the shell parts which press the pipe on to the nozzle and at the same time must serve to achieve the sealing effect. If these clamping flanges are loaded too heavily in an axial direction, then they are subjected to bending moments which may result in deformation. As the clamping flanges should engage the tube, normally directly behind an annular projection of the nozzle, this is no longer ensured during buckling of the clamping flanges.

In order to meet this danger, first of all, in accordance with a further proposal of the invention, it is conceivable that the nozzle has an outer collar and that at least one of the shell parts is provided with a stop projecting inwards, said stop engaging behind in an axial direction and being constructed as a safety device preventing separation of the nozzle and the connecting piece.

A stop serving this purpose may be formed either by a simple screw or another projection on the inside of one shell part. It is however also conceivable to provide a single additional flange for each shell part for this purpose which now engages behind the collar and also presses the pipe on to the nozzle as is not the case in a previously described embodiment.

However, if two additional flanges are used, then it is advantageous if the additional flange facing the connecting piece engages behind the collar located on the nozzle as a stop and safety device.

Figure 2:
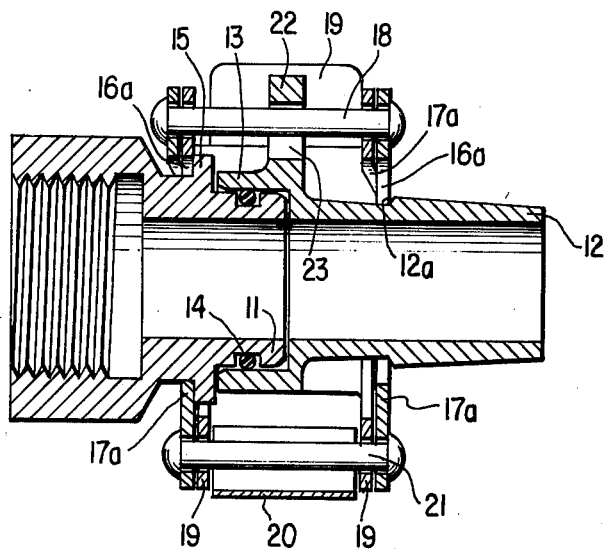
FIG. 2 shows a longitudinal section through the view according to FIG. 1.
Figure 3:
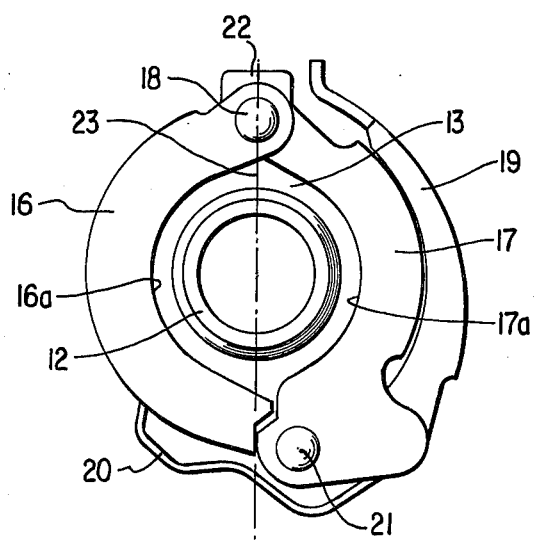
FIG. 3 shows a view of the hose fixing device from an axial direction.

Referring now to the drawings, in the embodiment according to FIGS. 1-3 the hose fixing device has a connecting piece 10, one end of which is constructed as a plug part 11. A nozzle 12 is provided at its end with a socket part 13 matched to the plug part 11. The socket part 13 is capable of being pushed on to the cylindrical outer surface of the plug part 11. An annular seal 14 is let into the outer surface of the plug part 11. The plug part 11 and the socket part 13 together form a disconnectable plug-in coupling.

The plug part 11 is provided with an outer collar 15 at the end of the thrust region. A hose end (not shown) is pushed on to the nozzle 12 and is pushed up to the begining of the actual socket part 13, over an outer annular projection 12a thereof.

A clamping device is formed from two shell parts 16 and 17 which are jointedly connected together at one end by means of a jointed bolt 18. The two other ends of the shell parts 16 and 17 are held together by a toggle actuated lock which is formed by a toggle lever 19 and a spring 20. The toggle lever 19 is articulated by means of a further joint bolt 21 to one end of the shell part 17.

The shell parts 16 and 17 have radially inwardly extending clamping flanges 16a or 17a respectively at both sides, these clamping flanges engaging on one side of the shell parts 16 and 17 behind the collar 15 of the connecting piece 10 when the clamping device is closed, while on the other side they press the hose end (not shown) directly behind the annular projection 12a from outside, against the nozzle 12. The part of the nozzle 12 extending in the direction of the socket part 13 has an increasing outer diameter.

The socket part 13 of the nozzle 12 is provided with a radially outwardly extending arm 22 which has a slot 23. The joint bolt 18 passes through the slot 23 so that the nozzle 12 is connected to the clamping device in a non-detachable manner.

Figure 4:
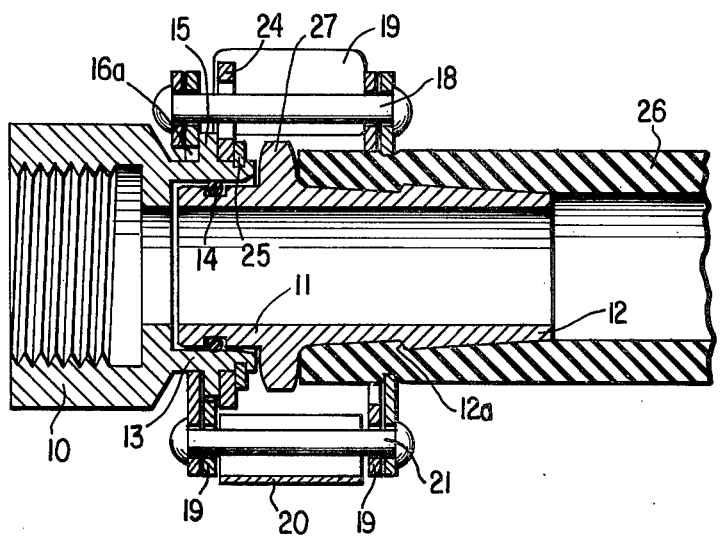
FIG. 4 shows a modified embodiment of the hose fixing device in the form of a longitudinal section.

In the embodiment shown in FIG. 4 the following differences exist with respect to the previously described embodiment:

The connecting piece 10 is constructed at its end as a socket part 13, while the nozzle 12 has at its end the plug part 11 with the annular seal 14.

The next difference consists in that the shell parts 16 and 17 are not now connected to the nozzle 12 but to the connecting piece 10. For this purpose a washer-shaped member 24 is placed against the collar 15 on the outer cylindrical periphery of the socket part 13 so that the member 24 is held thereby on one side. At the front face of the socket part 13, a retaining ring 25 is arranged, which engages into an external annular groove on the socket part 13 and retains the member 24 from the other side. In this embodiment too, the washer shaped member 24, which may be seen in FIG. 4, has a slot-like recess through which the joint bolt 18 passes, as is the case in the embodiment according to FIG. 2.

By connecting the shell parts 16 and 17 to the connecting piece 10, the advantage is achieved that, after separating the nozzle 12 from the connecting piece 10, a hose 26 pushed on to the nozzle may be pushed on or removed without hindrance from other construction parts. The nozzle 12 moreover has an outer collar 27 which may have suitable surfaces for engagement of a spanner. Therefore the nozzle 12 may be held either by means of a spanner or may be clamped in a vice or the like, if the hose 26 is seated too firmly on the nozzle 12 and cannot be removed without auxiliary means.

Figure 5:
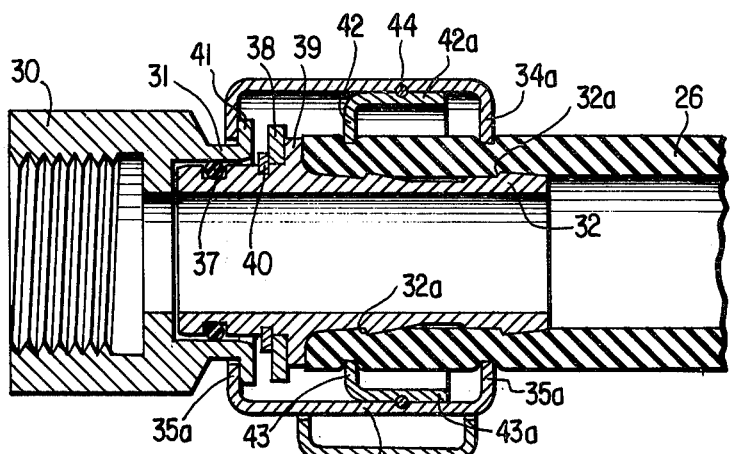
FIG. 5 shows a further embodiment in which the shell parts have an additional flange.

In the embodiment shown in FIG. 5 a connecting piece 30 is provided with a socket part 31 while a nozzle 32 has a plug part 33 fitting into the socket part 31. The nozzle 32 now has two annular projections 32a.

Jointedly connected shell parts 34 and 35 serve to hold the connecting piece 30 and the nozzle 32 together; they are provided with radially inwardly extending clamping flanges 34a or 35a at their sides. A toggle lever 36 and a spring (not shown) form a toggle actuated lock, the function of which is the same as that of the toggle actuated lock in the previously described embodiments.

The plug part 33 is again provided with an annular seal 37 let into an annular groove. A washer-shaped member 38 abuts an outer collar 39 of the nozzle 32 with one side, while it is held on its other side by a retaining ring 40 engaging into a groove of the plug part 33. The member 38 is connected, in the same manner, to a joint bolt (not shown) and jointedly connecting the shell parts 34 and 35 as in the earlier embodiments. The socket part 31 is provided with an outer collar 41 behind which is engaged the clamping flanges 34a and 35a at one side of the shell parts 34 and 35.

However, additional flanges 42 and 43 are provided on the inside of the shell parts 34 and 35, the additional flanges being fixed to the inside of the shell parts 34 and 35 by means of a part 42a or 43a bent at right angles, for example, by means of welding at points 44.

The additional flanges 42 and 43 are so arranged that they grip the hose 26 directly behind one annular projection 32a, while the right-hand clamping flanges 34a and 35a in FIG. 5 press the hose 26 directly behind the other annular projection 32a on to the nozzle 32.

The additional flanges 42 and 43 are arranged approximately on half the axial length of the shell parts 34 and 35. The toggle lever 36 and its spring are offset with respect to this middle position of the additional flanges 42 and 43 in the direction of the thrust side of the nozzle 32 so that the forces applied by the toggle actuated lock are substantially effective in the same peripheral region of the shell parts 34 and 35 in which the clamping flanges 34a and 35a gripping the hose 26 and the additional flanges 42 and 43 are located. As a result, the part of the shell parts 34 and 35 associated with the connecting piece 30 is relieved of these forces to a large extent and it is ensured that the clamping flanges 34a and 35a, gripping the hose 26 and the additional flanges 42 and 43 become effective with a uniform force as far as possible even if, in the closed position of the shell parts 34 and 35, because of differing hose strength or changed pressing force, an inner diameter is obtained which differs from the clear inner diameter of the clamping flanges 34a and 35a engaging behind the collar 41.

Figure 6:
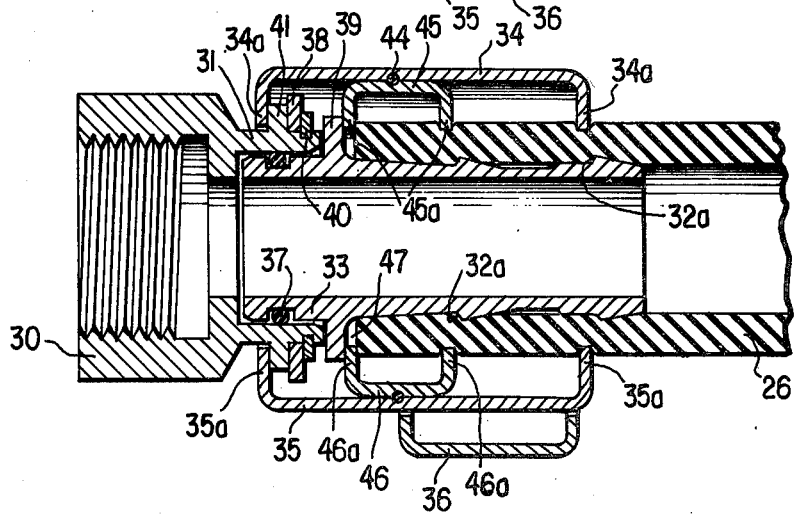
FIG. 6 shows another embodiment in which the shell parts are provided with two additional flanges.

In the embodiment shown in FIG. 6, a connecting piece 30 is provided with a socket part 31 and a collar 41 and nozzle 32 are provided with two annular projections. The nozzle 32 also has an external collar 39 which separates the plug part 33 from the part of the nozzle acting to retain the hose 26. However, the member 38 is pushed on to an outer cylindrical sleeve surface of the socket part 31 again now so that it abuts the collar 41 at one side, while it is retained by the retainer ring 40 at its other side.

In the same manner as in the embodiment according to FIG. 5, two shell parts 34 and 35 are provided with clamping flanges 34a and 35a and are held together by means of a toggle actuated lock.

An additional 45 and 46 is now fixed to the inside of the shell parts 34 and 35 respectively, by welding, at the point 44. The additional shells 45 and 46 have additional flanges 45a or 46a respectively on both sides.

As may be seen from FIG. 6, the shell parts 34 and 35 are so arranged with their additional shells 45 and 46 that the clamping flanges 34a and 35a come to rest on the hose 26 directly behind the front annular projection 32a, as seen in the thrust direction, while the right-hand additional flanges 45a and 46a in FIG. 6 grip the hose 26 directly behind the second annular projection 32a. The other additional flanges 45a and 46a engage behind the collar 39 wherein, if necessary, an annular attachment 47 may be provided as a bearing therefor.

If the hose 26 with the nozzle 32 is now loaded in the direction of separation of the socket part 31 and the plug part 33 then the appropriate axial forces are transmitted from the collar 39 to the left-hand additional flanges 45a and 46a and from these directly across the left-hand clamping flanges 34a and 35a to the collar 41 of the connecting piece 30. The right-hand clamping flanges 34a and 35a and the right-hand additional flanges 45a and 46a are loaded relatively little in an axial direction with respect thereto.

When separating the connecting piece 30 from the nozzle 32, after opening the toggle actuated lock, the latter remains with the shell parts 34 and 35 in connection with the connecting piece 30 so that the tube 26 is freely accessible in its entire region pushed on to the nozzle 32 and assembly is facilitated hereby.

The toggle actuated lock is preferably offset as far as possible in this embodiment until it is above the clamping flanges 34a and 35a gripping the hose 26, or above additional flanges 45a and 46a.

In particular, for the case where only fairly small operating pressures are to be expected, retention of the hose 26 may be sufficient only at one point. Thus it is also conceivable in the embodiment shown in FIG. 5 not to permit the additional flanges 42 and 43 to engage the tube 26 but to arrange the additional flange 42 so that it engages directly behind the collar 39, like the additional flange 45a, and thus serves directly as a safety device against separation of the connecting piece 30 and the nozzle 32.

It will be understood that the above description of the present invention is susceptible to various modification changes and adaptations.

What is claimed is:

1. In a hose fixing device including a nozzle member having a first end to be inserted into a hose terminus and a second end; a connecting member having a first end to be attached to a fluid carrying line and a second end; the nozzle member and the connecting member being substantially in axial alignment and the respective second ends being oriented towards one another; a disconnectable plug-in coupling formed of a plug part constituted by the second end of one of the members and a socket part constituted by the second end of the other member for receiving the plug part; and sealing means disposed between the socket part and the plug part for sealing the socket part to the plug part; the improvement comprising (a) a radially projecting, circumferential outer collar provided on said connecting member at said second end thereof;

(b) an outer annular circumferential projection being provided on said nozzle member at said second end thereof and being axially spaced from said collar; and (c) a single clamp including
(1) two complemental shells articulated to one of said members for a pivotal motion about a common axis into open and closed positions;
(2) toggle lock means connected to said shell parts for moving said single clamp into either position and for maintaining said single clamp locked in said closed position;
(3) first clamping flanges forming part of each shell and in said closed position, surrounding said nozzle in the axial space between said collar and said projection immediately adjacent said projection for pressing the hose circumferentially against said nozzle; and
(4) second clamping flanges forming part of each shell and in said closed position, surrounding and engaging said connecting member immediately behind said collar as viewed from said projection; said first clamping flange, by its pressing engagement with said nozzle with the intermediary of the hose and said second clamping flange, by its engagement with said connecting member behind said collar cooperating in their respective closed position for preventing separation of said plug part from said socket part.

2. A device as defined in claim 1, further comprising a radially outwardly extending mounting on said connecting member and a joint bolt connecting said shell parts and passing through said mounting.

3. A device as defined in claim 2, wherein said mounting comprises a washer-shaped member fixed on an external wall of said connecting member between said collar and a retaining ring carried by said connecting member.

4. A device as defined in claim 1, further comprising an additional radially inwardly extending flange between said clamping flanges of said shells for pressing the hose terminus onto said nozzle member simultaneously with said first clamping flanges.

5. A device as defined in claim 4, wherein said toggle lock means includes a toggle lever articulated to one of said shells and further wherein said toggle lever is offset towards said first clamping flanges with respect to a center location defined by one half the axial spacing between said first and said second clamping flanges.

6. A device as defined in claim 4, wherein said toggle lock means includes a toggle lever articulated to one of said shells and a toggle spring attached to said toggle lever and to said other shell and further wherein said toggle spring and toggle lever are offset towards said first clamping flanges with respect to a center location defined by one half the axial spacing between said first and said second clamping flanges.

7. A device as defined in claim 4, wherein said additional flange is arranged in the central region between said clamping flanges.

8. A device as defined in claim 1, further comprising two radially inwardly extending additional flanges between said clamping flanges of said shells, one of said additional flanges pressing said hose terminus on said nozzle member simultaneously with said first clamping flanges.

9. A device as defined in claim 8, wherein said two additional flanges comprise a component part of an additional shell attached to the inside of complemental shells.

10. A device as defined in claim 1, further comprising an outer collar on said nozzle member and an inwardly projecting stop on at least one of said shells for engagement behind said outer collar on said nozzle member in an axial direction to act as a safety device against separation of said nozzle member and said connecting member.

11. A device as defined in claim 10, wherein said inwardly projecting stop includes an additional flange on said shells.

12. A device as defined in claim 1, wherein said nozzle member has an increasing outer diameter from said projection in the direction of said collar.

* * * * *